S. M. HINO.
WIND SHIELD.
APPLICATION FILED AUG. 29, 1916.

1,255,094.

Patented Jan. 29, 1918.

WITNESSES
W. C. Fielding
Bess J. H. Woodward

INVENTOR
Seth M. Hino
BY Richard Owen
ATTORNEY

UNITED STATES PATENT OFFICE.

SETH M. HINO, OF LANDER, WYOMING.

WIND-SHIELD.

1,255,094.  Specification of Letters Patent.  Patented Jan. 29, 1918.

Application filed August 29, 1916.   Serial No. 117,519.

*To all whom it may concern:*

Be it known that I, SETH M. HINO, a citizen of the United States, residing at Lander, in the county of Fremont and State of Wyoming, have invented certain new and useful Improvements in Wind-Shields, of which the following is a specification.

This invention relates to an improved wind shield for use in connection with an automobile and the principal object of the invention is to provide a wind shield so constructed that it will fit over the engine hood, the shield being pivotally connected with the body of the automobile, in such a manner that it may be swung upwardly to permit the engine hood to be opened when necessary.

Another object of the invention is to so construct this hood that it may be securely held in place when in use and braced by means of straps leading to eyes carried by the body of the automobile.

Another object of the invention is to so construct this shield that it will deflex the air current toward the sides of the car thus effectively protecting the driver from the air current created when driving the automobile.

This invention is illustrated in the accompanying drawings, wherein:—

Figure 1:
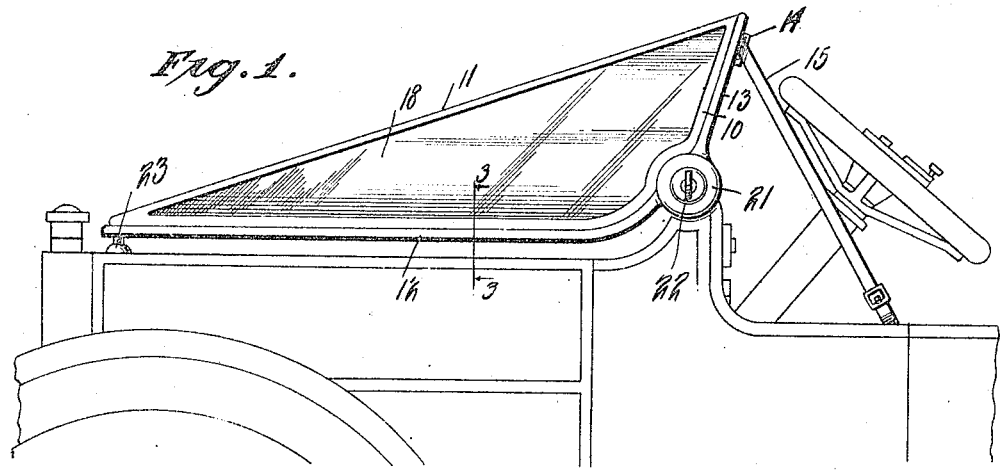
Figure 1 is a view in side elevation showing the improved wind shield connected with an automobile.
Figure 2:
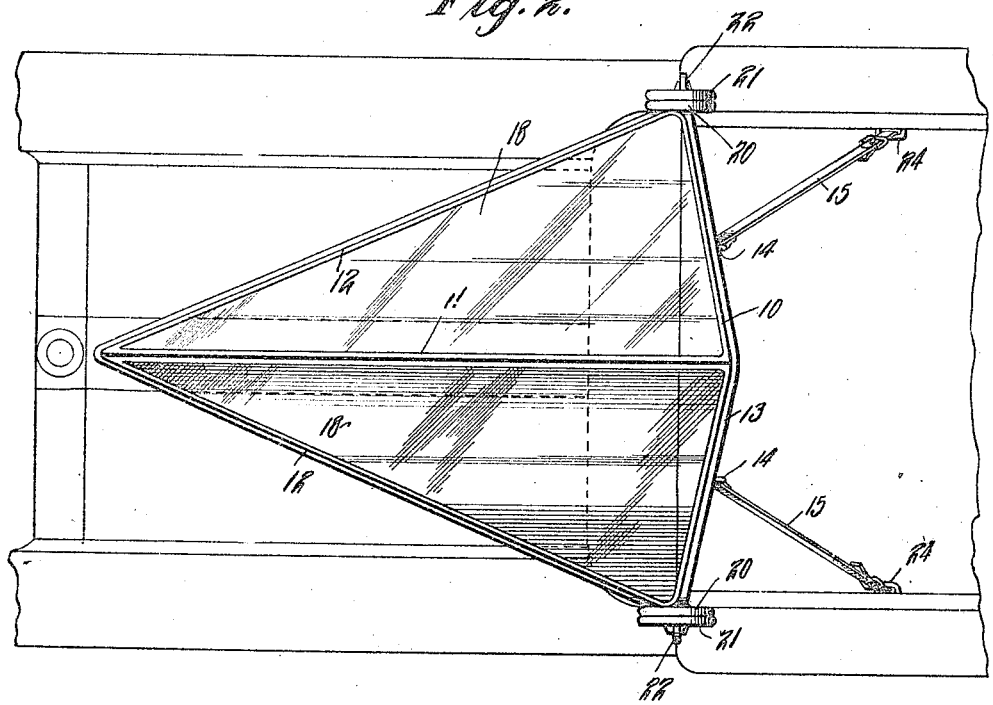
Fig. 2 is a top plan view of the wind shield in place upon an automobile.
Figure 3:
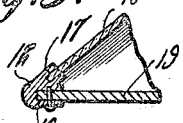
Fig. 3 is a fragmentary sectional view through the wind shield taken along the line 3—3 of Fig. 1.

The shield is provided with a frame 10 which is provided with sloping sides and is shaped as clearly shown in Figs. 1 and 2 so that the rear portion will be higher than the forward end and so that the air current will be divided and guided toward the sides of the car. This frame is provided with a center bar 11, side bars 12, and a rear bar 13 provided upon opposite sides of the center bar 11 with eyes 14 with which the bracing straps 15 are connected. These bars which form the frame of the shield are formed as more clearly shown in Fig. 3, the side bars 12 being provided with lower grooves 16 in addition to the upper grooves 17 which are common to all of the bars. The sheets of glass 18 fit into the grooves or seats 17 and a bottom plate 19 which may be formed of any suitable material fits into the seats or grooves 16 thus producing a wind shield which is closed excepting at the rear end. It will thus be seen that if desired, this wind shield will form a pocket in which articles may be placed.

The frame is provided with bearings 20 which fit against the bearings 21 of the automobile frame and are connected with the bearings by means of fasteners 22. By loosening these fasteners 22, the shield can be swung upwardly thus permitting the engine hood to be opened when necessary. When in the lowered position, the shield is as shown in Figs. 1 and 2 with its forward end resting upon the support 23 and the fasteners tightened to prevent movement. The bracing straps 15 are connected with the eyes 24 of the automobile frame and will serve to brace the hood against movement which might tend to weaken or loosen the fasteners. It will thus be seen that this shield will be very effective in operation and further that it will not be in the way when in place.

What is claimed is:—

The combination with an automobile body including side walls having bearings extending therefrom of a shield comprising a frame including side bars extending in diverging relation, an intermediate bar extending from the connected forward ends of the side bars at upward incline toward its rear end, rear bars connecting the side bars with the intermediate bar, side plates carried by said bars, a bottom plate fitting into seats formed in the side bars, bearings extending from the rear bars to engage the bearings of the automobile body, and means for releasably holding the bearings in tight engagement to hold the shield in an adjusted position.

In testimony whereof I affix my signature in presence of two witnesses.

SETH M. HINO.

Witnesses:
JOHN DILLON,
THOS. B. WRIGHT.